United States Patent [19]

Waters

[11] Patent Number: 4,573,050

[45] Date of Patent: Feb. 25, 1986

[54] DUAL SCAN RATE RADAR

[75] Inventor: William M. Waters, Millersville, Md.

[73] Assignee: The United States of America as represented by the Secretary of the Navy, Washington, D.C.

[21] Appl. No.: 467,421

[22] Filed: Feb. 17, 1983

[51] Int. Cl.⁴ .................................................. G05L 7/28
[52] U.S. Cl. ................................. 343/17.1 R; 343/372
[58] Field of Search ............ 343/16 LS, 16 R, 17.1 R, 343/13 R, 372, 377, 408, 375, 12 R

[56] References Cited

U.S. PATENT DOCUMENTS

| | | | |
|---|---|---|---|
| 3,803,613 | 4/1974 | Wright | 343/55 A |
| 3,835,448 | 9/1974 | Berthens | 340/6 R |
| 3,885,237 | 5/1975 | Kirkpatrick | 343/5 W |
| 4,001,837 | 1/1977 | Regenos et al. | 343/375 X |
| 4,072,956 | 2/1978 | Provencher | 343/371 X |
| 4,212,084 | 7/1980 | Poole | 367/118 |
| 4,303,920 | 12/1981 | Mortimer | 343/17.1 R |
| 4,310,843 | 1/1982 | Yoder | 343/100 SA |

*Primary Examiner*—Thomas H. Tarcza
*Assistant Examiner*—Mark Hellner
*Attorney, Agent, or Firm*—Robert F. Beers; William T. Ellis; Charles E. Krueger

[57] ABSTRACT

A dual scan rate radar system (DSR) including a phased array antenna, a transmitter, a receiver and a control unit. Each rf pulse from the transmitter includes contiguous long-range and short-range pulses. The control unit adjusts the antenna so that the long-range pulse is transmitted into a slow beam at $\theta_S$ and the short-range pulse is transmitted into a fast beam at $\theta_F$. The control unit also adjusts the antenna to receive the short-range pulse echos during a first part of the interpulse interval and the long-range pulse echos during a second part of the interpulse interval. The angles $\theta_S$ and $\theta_F$ are varied so that the slow and fast beam are scanned at dual rates $R_S$ and $R_F$, respectively, where $R_S < R_F$.

18 Claims, 3 Drawing Figures

DUAL SCAN RATE RADAR

BACKGROUND OF THE INVENTION

The invention relates generally to search radar systems and more particularly to a search radar system with dual scanning rates.

The requirements for effective operation of search radar vary significantly with respect to long-range and short-range targets. In order to detect a long-range target the signal energy radiated in the target direction must be high. This high energy may be achieved by either utilizing a low scanning rate or increasing the rf output power level radiated from the antenna. Since increasing power requires expensive components in the transmitter it is preferable to search for long-range targets with a low scanning rate. This low scanning rate is tolerable for long-range targets since adequate time is available to prepare defenses against the target.

However, for short-range targets, such as sea skimmers and pop-ups, a high scanning rate is required to provide the high date rate needed for defensive preparations. But since the targets are close-in only low signal power is required for accurate detection.

Thus, a search radar effective against both long-range and short-range targets requires a high scanning rate and high average power radiated from the antenna. However, the high power is not required for the detection of short-range targets and the high data rate on long-range targets is of little utility.

Since the extra power required to scan for long-range targets at a high rate increases the cost of the transmitter this waste of power is a significant disadvantage of existing search radar systems.

OBJECTS OF THE INVENTION

Accordingly, it is an object of the invention to detect long-range and short-range targets utilizing less output power than existing systems.

It is a further object of the invention to utilize a low scanning rate to detect long-range targets and a high scanning rate to detect close-in targets.

SUMMARY OF THE INVENTION

The above and other objects are achieved in the present invention which comprises a phased array antenna, a transmitter, a receiver and a control unit. The phased array antenna includes an azimuthal combining network having the radiating elements of the antenna connected thereto by transmission lines including variable phase shifters. These phase shifters must be capable of switching between phase settings in a time period small relative to the width of the radar pulses.

The rf pulses supplied by the transmitter includes contiguous long-range and short-range pulses. The control unit adjusts the phase shifters so that the long-range pulse is transmitted at $\theta_{S1}$ and the short-range pulse at $\theta_{F1}$. The control unit varies $\theta_{S1}$ and $\theta_{F1}$, by adjusting the phase shifters, so that the long-range beam is scanned slowly at scanning rate $R_S$ and the short-range beam is scanned rapidly at scanning rate $R_F$.

Since the echos from the short-range beam are received first the receiving beam is positioned at $\theta_{F1}$ during a first part of the interpulse interval and is positioned at $\theta_{S1}$ for the remainder of the interpulse interval to receive long-range echos.

This sequence is repeated with each rf pulse with the values of $\theta_{Fi}$ and $\theta_{Si}$ varied to produce the desired scan rates.

In a preferred embodiment the elevation coverage angle of the short-range beam is greater than the elevation coverage angle of the long-range beam. This increased elevation angle coverage compensates for the inability of the rapidly scanned short-range beam to detect high-altidue targets.

Since the long-range beam is scanned at a low rate, $R_S$, the average power and peak power requirements of the transmitter are lower than conventional radar systems. Additionally, the high scanning rate, $R_F$, of the short-range beam provides adequate coverage to prepare defenses against short-range targets.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The present invention provides a slow beam for searching at long-range and a fast beam for searching at short range where both beams are radiated from a single phased array antenna.

Figure 1:
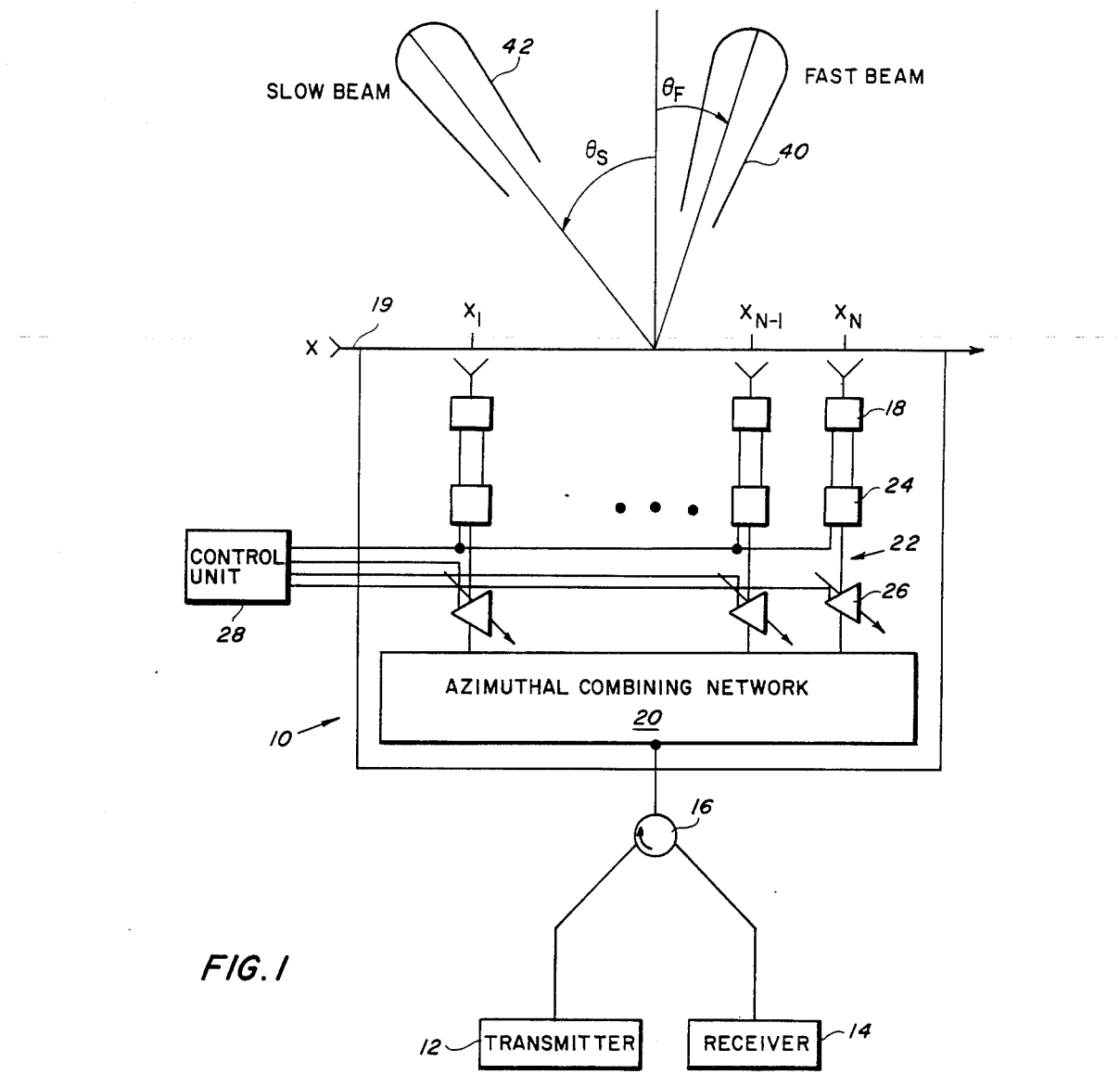
FIG. 1 is a schematic diagram of a top view of a preferred embodiment of the invention.

Referring now to the drawings, wherein like reference numerals designate identical or corresponding parts throughout the several views, and more particularly to FIG. 1 thereof, a schematic diagram representing a top view a preferred embodiment of the present invention is depicted. A phased array antenna 10 is interconnected with a transmitter 12 and a receiver 14 by a duplexer 16. It is understood that the receiver 16 includes a signal processor and signal display means. The antenna includes N radiators 18 which are vertical boards described more fully below with reference to FIG. 2. Each radiator 18 is connected to an azimuthal combining network 20 by a transmission line circuit 22 including a switch 24 and a variable phase shifter 26 connected in series. The switches 24, variable phase shifter 26 and transmitter 12 are interconnected with and controlled by a control unit 28.

Figure 2:
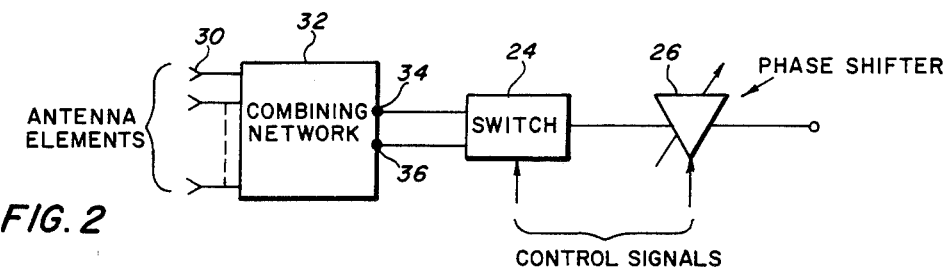
FIG. 2 is a schematic diagram of a side view of a vertical board.

FIG. 2 is a side view of one radiator 18. Referring to FIG. 2, M radiating elements 30 are interconnected to a vertical combining network 32 with a first and second port 34 and 36. The switch 24 connects either the first or second port 34 or 36 to the variable phase shifter 26. The vertical combining network 32 is designed so that the elevation coverage angle of the beam is increased when power is switched from the first port 34 to the second port 36.

The operation of the invention will now be described. Referring back to FIG. 1 two beams are depicted, a fast beam 40 at $\theta_{Fj}$ and a slow beam 42 at $\theta_{Sj}$. It is well-known in the art that if the relative phase difference between the signals from the radiators is zero then the beam will be broadside to the array at an angle $\theta = 0$.

However, if the phase shifters are adjusted so that the relative phase shift between adjacent radiators is a nonzero constant, $\phi_i$, then the direction of the main beam is at an angle $\theta_i$. The phase difference, $\phi_i$, is related to the beam angle, $\theta_i$, by the formula:

$$\phi_i = kd \sin \theta_i \qquad (1)$$

where $k = 2\pi/\lambda$ and $\lambda$ is the wavelength of the beam. Thus by adjusting the phase shifters the beam may be directed in any predetermined angle.

Figure 3:
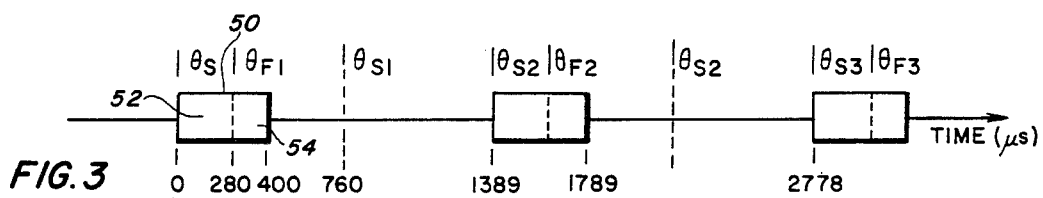
FIG. 3 is a graph depicting the switching sequence for an rf pulse train.

As described above, the antenna provides two beams, one being scanned at a fast rate and the other at a slow rate. In order to achieve this dual scan rate part of each rf pulse must be radiated into the slow beam and part into the fast beam. Similarly, the receiving beam must be switched between the fast and slow position during the interpulse period. FIG. 3 is a graph of the rf pulse train illustrating this switching sequence. Note that each pulse 50 includes contiguous long and short-range pulses 52 and 54. These long-range and short-range pulses are expanded pulses formed by a pulse expander/compressor which is part of the transmitter. At $t=0$ the phase shifters are switched to a first setting so the long-range pulse is transmitted into the slow beam at $\theta_{S1}$, where $\theta_{S1}$, is an arbitrary starting angle. At $t=280$ μs the phase shifters are rapidly switched to a second setting so that the short-range pulse is transmitted into the fast beam at $\theta_{F1}$. The echo from targets are received during the interpulse interval $t=400$ μs to $t=1389$ μs. Since echos from close-in targets will be received first, the phase shifters remain at the second setting while the short-range echos are received from time $t=400$ μs to $t=760$ μs. At $t=760$ μs the phase shifters are switched back to the first setting to receive the echoes of the long-range pulse from long-range targets. At $t=1389$ μs the sequence is repeated for $\theta_{S2}$ and $\theta_{F2}$. Note that the duration of the long-range pulse is greater than the short-range so that greater signal energy is available to detect long-range targets. This particular timing sequence is presented only by way of example and does not limit the scope of the invention.

The angular differences $\Delta\theta_S = \theta_{S2} - \theta_{S1}$ and $\Delta\theta_F = \theta_{F2} - \theta_{F1}$ are selected to obtain the desired scan rate for each beam where the scan rate for the fast beam is $R_F$ and the scan rate for the slow beam is $R_S$. This switching sequence between the fast and slow beams is repeated every 1389 μsec. until the complete sector is scanned. In every case $\theta_{S,i+1} - \theta_{Si} = \Delta\theta_S$ and $\theta_{F,i+1} - \theta_{Fi} = \Delta\theta_F$. The phase shifts which must be applied by the variable phase shifter to steer the beam in the correct direction are calculated utilizing eq. (1).

For example, in FIG. 1 let the radiators 18 of the phased array antenna be distributed along the x axis of a rectangular co-ordinate system 19. If the nth radiator is positioned at $x_n$ then the phase at the nth radiator required to steer the beam at angle $\theta$ is given by:

$$\phi_n = kx_n \sin \theta \qquad (2)$$

For the fast beam to scan at 90° sector in a scan time of 4 sec. the angular change, $\Delta\theta_F$, per pulse is 90°/4 sec x0.001389 sec/pulse=0.031°/pulse. Thus, the phase shifters are adjusted to shift $\theta_F$ by 0.031° from one pulse to the next. Similary, for the slow beam to scan the 90° sector in 40 sec. requires $\theta_S$ to be shifted 0.003° per pulse.

In general $$\Delta\theta = W/T_{SC} \times T_o \qquad (3)$$

where W is the azimuthal width of the sector being scanned, $T_{SC}$ is the scan time and $T_o$ is the time interval between the leading edges of successive pulses. Note that $$R = W/T_{SC} \qquad (4)$$

so that $$\Delta\theta = R \times T_o \qquad (5)$$

Additional information pertaining to the mechanics of beam scanning is set forth in the book edited by M. Skolnik entitled *Radar Handbook*, McGraw-Hill, New York, 1970, Ch. 11. The details of constructing the azimuthal combining network in FIG. 1 and the vertical boards in FIG. 2, not included herein, are also set forth in this chapter.

Note that the phase shifters must be adjusted in time interval much smaller than the pulse width. Thus, the phase shifters much be adjustable in a time interval on the order of microseconds.

In practice the variable phase shifters may be digital phase shifters. These phase shifters are fast and are described in the book by M. Skolnik entitled "Introduction to Radar Systems", McGraw-Hill, N.Y., 1980 p. 287-288 and in Raytheon's "Electronic Progress" Vol. XVII, No. 4, 1974. This reference also describes the pulse expander/compressor utilized in the transmitter.

The control unit 26 includes a master oscillator that provides a clock signal for synchronizing the operation of the various components of the system. The various phase shifts, calculated from eg. (2), required to scan the beam for the 4/40 dual scan time example set forth are stored in the read only memory of a microprocessor in the control unit 18 and called in the time sequence illustrated in FIG. 3. The microprocessor provides digital output signals encoding these phase-shifts which are directed to the phase shifters for steering the beam. Alternatively, the microprocessor could be programmed to calculate the phase shifts for any desired scan times or scanning rates.

One problem associated with the fast beam is the inability to detect short-range targets at high altitudes. Accordingly, a control signal from the control unit 28 to each switch causes the switch to direct power to the first port of the vertical combining network when the beam is in the slow position and to the second port when the beam is in the fast position. Thus, beam elevation coverage angle is increased for the short-range beam so that high altitude targets are detected.

A comparison of the present dual scan rate radar system with a conventional radar system is set forth in Table I.

TABLE I

Dual Scan Rate Radar (DSR)
Total Power Requirement Compared to Conventional Radar

| Parameter | DSR | Conventional |
|---|---|---|
| Peak Power (W) | 3300 | 16,000 |
| Average power (W) | 640 | 3200 (+7 dB) |
| Wavelength (ft) | 0.333 | 0.333 |
| Antenna aperture (ft$^2$) | 50 | 50 |
| Scar time (sec) | 4/40 | 4 |
| Pulse width (μs) | 300/300 | 600 |
| PRF (pps) | 290 | 290 |
| Detection range (n.m.) (1m$^2$) | 35/112 | 112 |

In this example the scan times, i.e., the reciprocal of the scan rates, for the DSCR are 4 seconds for the short-range beam and 40 seconds for the long-range beam. Note that the peak power requirements of a conventional system with a four second scan time are much higher than for the DSR system. In the example presented in Table I the difference in power required by both the fast beam and the slow beam of the DSR and the power required of a conventional radar which scans the entire volume at the high rate is 7 dB.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A dual scan rate search radar system (DSR) comprising:
   a phased array antenna including a like plurality of radiators and variable phase shifters wherein each of said phase shifters is connected to a different radiator;
   transmitter means, having its output connected to said antenna, for transmitting a transmission beam of rf pulses;
   receiving means, having its input connected to said antenna, for receiving and processing a receiving beam of echos from the transmission beam pulses;
   control means, interconnected with said transmitter and said phase shifters for scanning said transmission and receiving beams at predetermined different dual rates, $R_S$ and $R_F$, by adjusting said phase shifters, wherein the beam scanned at $R_S$ is designated the slow beam and the beam scanned at $R_F$ is designated the fast beam.

2. The DSR recited in claim 1 wherein:
   said transmitter means generates an rf pulse train of pulses of width $\tau$ where the interpulse time interval is of length T;
   and wherein said transmitter means further comprises means for generating a long-range pulse contiguous to a short range pulse in each of said rf pulse where said long-range pulse is of width $\tau_S$ and said short-range pulse is of length $\tau_F$ and where $\tau_F + \tau_S = \tau$, and where $\tau_S > \tau_F$.

3. The DSR recited in claim 2 wherein:
   said control means includes means for adjusting said phase shifters so that said antenna radiates said long-range pulse into said slow beam and radiates said short-range pulse into said fast beam.

4. The DSR recited in claim 3 wherein:
   said means for generating a long-range pulse contiguous to a short-range pulse further comprises means to generate said long-range pulse in the first part of said rf pulse and said short-range pulse in the second part of said rf pulse.

5. The DSR recited in claim 4 wherein:
   said control means further includes means for adjusting said phase shifters so that said antenna receives the echos of said range-range pulse radiated into said fast beam during a first part of the interpulse time interval and receives the echos from said long-range pulse radiated into said slow beam during a second part of the interpulse interval.

6. The DSR recited in claim 5 wherein:
   said variable phase shifters are digital phase shifters; and
   said control means further includes means for generating digital signals to adjust said phase shifters.

7. A dual scan rate search radar system (DSR) comprising:
   a phased array antenna including a plurality of antenna elements wherein each antenna element includes a radiator and a variable phase shifter and wherein each radiator is a vertical board, each with a first input port and a second input port;
   a plurality of switches, equal in number to said plurality of antenna elements, positioned between the output of said phase shifter and the first and second input ports of said vertical boards, said switches for interconnecting said phase shifter with either the first input port or the second input port in response to a switch control signal;
   transmitter means, having its output connected to said antenna, for transmitting a transmission beam of rf pulses;
   receiving means, having its input connected to said antenna, for receiving and processing a receiving beam of echos of the pulses transmitted into said transmission beam;
   control means, interconnected with said transmitter, said phase shifters and said switches, for scanning said transmission and receiving beams at dual rates, $R_S$ and $R_F$, by adjusting said phase shifters, where the beam scanned at $R_S$ is designated the slow beam and the beam scanned at $R_F$ is designated the fast beam, said control means also for generating a first control signal to interconnect said phase shifters with the first input port of said vertical boards when said phase shifters are adjusted to scan at $R_S$ and for generating a second control signal to interconnect said phase shifters with the second input port of said vertical boards when said phase shifters are adjusted to scan at $R_F$.

8. The DSR recited claim 7 with each of said vertical boards comprising:
   a plurality of radiating elements,
   a vertical combining array, interconnected with said radiating elements, with a first input port and a second input port, wherein said first and second input ports of said vertical combining network are said first and second input ports of said vertical boards, said vertical combining network for increasing the elevation coverage angle of said transmission and receiving beams when said phase shifter is interconnected with said second input port compared to the elevation coverage angle of said beams when said phase shifter is interconnected with said first input port.

9. The DSR recited in claim 8 wherein:
   said transmitter means generates an rf pulse train of pulses of width $\tau$ where the interpulse time interval is of length T;
   and wherein said transmitter means further comprises means for generating a long-range pulse contiguous to a short-range pulse in each of said rf pulse wherein said long-range pulse is of width $\tau_S$ and said short-range pulse is of length $\tau_F$ and where $\tau_F + \tau_S = \tau$.

10. The DSR recited in claim 9 wherein:
said control means includes means for adjusting said phase shifters so that said antenna radiates said long-range pulse into said slow beam and radiates said short-range pulse into said fast beam.

11. The DSR recited in claim 10 wherein:
said means for generating a long-range pulse contiguous to a short-range pulse further comprises means to generate said long-range pulse in the first part of said rf pulse and said short-range pulse in the second part of said rf pulse.

12. The DSR recited in claim 11 wherein:
said control means includes means for adjusting said phase shifters so that said antenna receives the echos of said short-range pulse radiated into said fast beam during a first part of the interpulse time interval and receives the echos from said long-range pulse radiated into said slow beam during a second part of the interpulse interval.

13. The DSR recited in claim 12 wherein:
said variable phase shifters are digital phase shifters; and
said control means includes means for generating said digital signals for adjusting said phase shifters.

14. The DSR recited in claim 13 wherein:
said switches are digital switches; and
said control means includes means for generating digital switch control signals.

15. A dual scan rate search radar system (DSR) comprising:
a phased array antenna;
transmitter means, having its output connected to said antenna, for transmitting a transmission beam of rf pulses,
receiving means, having its input connected to said antenna, for receiving and processing a receiving beam of echos of the pulses transmitted into said transmission beam;
means for scanning said transmission beam and said receiving beam at a dual rates, $R_S$ and $R_F$ with $R_S < R_F$, where a fast beam, scanned at $R_F$, detects short-range targets and a slow beam, scanned at $R_S$, detects long-range targets.

16. A method for providing a slow scanning beam and fast scanning beam from a single phased array antenna of the type including a plurality of variable phase shifters for steering the beam, said method comprising the steps of:
providing a train of rf pulses to said antenna wherein each pulse is of length $\tau$ and includes a long-range pulse of length $\tau_S$ and a short-range of pulse of length $\tau_F$ where $\tau_S + \tau_F = \tau$ and wherein the interpulse interval is of length T;
radiating said long-range pulses into a slow beam scanned at rate $R_S$;
radiating said short-range pulse into a fast beam scanned at rate $R_F$;
receiving the echos from said short-range pulse during a first part of said interpulse interval; and
receiving the echos from said long-range pulses during a second part of said interpulse interval.

17. The method recited in claim 16 wherein:
said step of radiating said long-range pulses into said slow beam includes the step of adjusting said phase shifters to vary the beam angle, $\theta_S$, of the slow beam by a fixed increment, $\Delta\theta_S$, from one pulse to the next wherein $$\Delta\theta_S = R_S \times W$$

W being the width of the sector scanned by the beam and $R_S$ being the scanning rate, and
said step of radiating said short-range pulses into said fast beam includes the step of adjusting said phase shifters to vary the beam angle, $\theta_F$, of the fast beam by a fixed increment, $\Delta\theta_F$, from one pulse to the next wherein $$\Delta\theta_F = R_F \times W$$

W being the width of the sector scanned by the beam and $R_F$ being the scanning rate.

18. The method recited in claim 17 wherein:
said step of receiving said echos of said short-range pulses includes the step of adjusting said phase shifters to vary the angle, $\theta_F$, of the receiving beam of said antenna by a fixed increment, $\Delta\theta_F$, from one interpulse interval to the next wherein $$\Delta\theta_F = R_F \times W$$

W being the width of the sector scanned by the beam and $R_F$ being the scanning rate of the fast beam; and
said step of receiving said long-range pulses includes the step of adjusting said phase shifters to vary the angle, $\theta_S$, of the receiving beam by a fixed increment, $\Delta\theta_S$, from one interpulse interval to the next wherein $$\Delta\theta_S = R_S \times W$$

W being the width of the sector scanned by the beam and $R_S$ being the scanning rate.

* * * * *